(12) United States Patent
Craft et al.

(10) Patent No.: US 10,148,795 B1
(45) Date of Patent: Dec. 4, 2018

(54) TCP OFFLOAD DEVICE THAT BATCHES SESSION LAYER HEADERS TO REDUCE INTERRUPTS AS WELL AS CPU COPIES

(71) Applicant: Alacritech, Inc., San Jose, CA (US)

(72) Inventors: Peter K. Craft, San Francisco, CA (US); Clive M Philbrick, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 106 days.

(21) Appl. No.: 15/006,412

(22) Filed: Jan. 26, 2016

Related U.S. Application Data

(62) Division of application No. 12/581,342, filed on Oct. 19, 2009, now Pat. No. 9,306,793.

(60) Provisional application No. 61/107,439, filed on Oct. 22, 2008.

(51) Int. Cl.
  *G06F 15/16* (2006.01)
  *H04L 29/06* (2006.01)
  *H04L 29/08* (2006.01)
  *H04L 12/879* (2013.01)

(52) U.S. Cl.
  CPC .......... *H04L 69/161* (2013.01); *H04L 49/901* (2013.01); *H04L 69/321* (2013.01)

(58) Field of Classification Search
  CPC ... H04L 29/06; H04L 49/9063; H04L 69/168; H04L 69/169; H04L 69/18; H04L 69/32; G06F 5/10
  See application file for complete search history.

(56) References Cited

U.S. PATENT DOCUMENTS

| 9,306,793 | B1 * | 4/2016 | Craft | H04L 67/06 |
| 2007/0206553 | A1 * | 9/2007 | Khushu | H04L 29/12264 370/338 |
| 2010/0095064 | A1 * | 4/2010 | Aviles | H04L 67/2852 711/118 |

\* cited by examiner

*Primary Examiner* — Hitesh Patel
(74) *Attorney, Agent, or Firm* — Mark Lauer; Silicon Edge Law Group LLP

(57) ABSTRACT

A TCP offload system is disclosed including apparatuses and methods for batching session layer headers to reduce interrupts as well as CPU copies. One embodiment includes the following steps: receiving a plurality of TCP packets: processing the packets by TCP, including removing TCP headers from TCP data, associating the TCP data with a TCP connection for an application, and updating a TCP control block (TCB) that defines the TCP connection; locating a plurality of upper layer headers in the TCP data, the headers each corresponding to application data contained in the packets, wherein the plurality of upper layer headers correspond to a protocol that is higher than TCP; processing the plurality of upper layer headers by the application to obtain memory locations for the application data; and placing the application data in the locations, after the processing of the plurality of upper layer headers by the application.

28 Claims, 4 Drawing Sheets

TCP OFFLOAD DEVICE THAT BATCHES
SESSION LAYER HEADERS TO REDUCE
INTERRUPTS AS WELL AS CPU COPIES

This application claims the benefit under 35 U.S.C. § 120 (is a divisional of) U.S. application Ser. No. 12/581,342, filed by the same inventors on Oct. 19, 2009, which in turn claims the benefit under 35 U.S.C. § 119 of Provisional Application No. 61/107,439, filed by the same inventors on Oct. 22, 2008, both of the above applications being incorporated by reference herein.

This invention relates to network communication, for example serial communication between devices using a protocol such as Transmission Control Protocol (TCP).

TCP has been employed for decades and has increased in popularity, or at least in usage, over the years. An advantage of TCP is its guaranteed delivery of error free data. Unfortunately, this guarantee comes with a price of greater complexity relative to some other network protocols. Such complexity can slow TCP communication, or at least make it difficult for TCP to be used as network data rates increase, for example from 100MB/s ten years ago to 10GB/s currently. Moreover, even for a 100MB/s transmission line rate that was conventional ten years ago, TCP processing at the endpoints of the network proved a bottleneck that slowed network communication, as well as consumed inordinate CPU cycles.

A solution to the TCP bottleneck was provided by Alacritech, Inc., which offloaded established TCP connections from the host CPU to hardware that could process data transfer much more rapidly, significantly increasing TCP data transfer rates while reducing CPU utilization. Descriptions and claims to such a solution can be found in multiple patents, including U.S. Pat. Nos. 7,337,241; 7,284,070; 7,254,696; 7,237,036; 7,191,318; 7,191,241; 7,185,266; 7,174,393; 7,167,927; 7,167,926; 7,133,940; 7,124,205; 7,093,099; 7,089,326; 7,076,568; 7,042,898; 6,996,070; 6,965,941; 6,941,386; 6,938,092; 6,807,581; 6,757,746; 6,751,665; 6,697,868; 6,687,758; 6,658,480; 6,591,302; 6,470,415; 6,434,620; 6,427,173; 6,427,171; 6,393,487; 6,389,479; 6,334,153; 6,247,060; and 6,226,680, which are incorporated by reference herein.

For a situation in which an application is running on a host CPU while a TCP connection for that application is handled by a network interface card (NIC), however, communications between the host and the device could sometimes hamper performance. For example, to receive data for an offloaded connection, the network interface card would "indicate" a small amount of data that included a session layer header to the host. The host would move that small amount of data, via the device driver and the host's TCP/IP stack, to the application, which would then process the session layer header to allocate buffers for the data corresponding to the session layer header. The card could then place the data, by direct memory access (DMA), into the buffers allocated by the application, so that the host CPU could completely avoid copying the application data. This was sometimes termed a "zero-copy receive."

Zero-copy receive works particularly well for receiving relatively large blocks of data transported in multiple packets, in which case the data can be placed in a destination with relatively few interrupts. But for relatively small blocks of data transported in one or two packets, the interrupts generated when the session layer headers and data cross an input/output (I/O) bus can impair performance. The present inventors have discovered that one reason for this is that interrupt aggregation, which may otherwise allow several received packets to be passed from a NIC to a host CPU with a single interrupt, can be rendered ineffective by the sequential transport of session layer headers across the I/O bus, each of which needs to be processed by an application before the next session layer header is transported over the I/O bus.

In the case of a solicited receive, in which the data being received is in response to a read request, there is an opportunity to pre-post a receive buffer along with the request. That is, because the application will be receiving data that it has requested, a buffer for that data can be allocated at the time the request is made. This allows the response to be placed in the appropriate memory location when the response arrives, without processing the session layer header by the application. For an unsolicited receive, however, a mechanism does not exist to pre-allocate a buffer or buffers for incoming data, because the amount of data and the aspect of the application that is involved are not known before the data is received. Moreover, as a practical matter, pre-posting buffers for solicited receives is not widely employed by current commercial applications, so that the performance issues described above affect more than merely unsolicited receives.

The most common applications that use TCP, such as Server Message Block (SMB) and Common Internet File System (CIFS), Network File System (NFS), and Internet Small Computer System Interface (iSCSI), all have certain aspects in common. Data sent by a client (or initiator) to a server (or target), is comprised of a session layer header (sometimes called an application header), possibly followed by session layer data (sometimes called application data). When session-layer data exists, the session layer header describes the nature and length of the data. Since these session layer headers and data exist within the TCP data stream, they can be located anywhere in received TCP packet.

Because TCP is a byte-stream protocol that is designed to deliver data in the correct order to the applications above it, which are designed to process that data in order, having session layer headers located anywhere in received TCP packet is usually immaterial, because the application simply processes the data in order as it works its way through packets. But an issue exists for offloaded TCP, as mentioned above, because the sequential processing of session layer headers and data can result in extra interrupts for relatively small data blocks.

An example of the issue and some solutions that have been developed may be instructive at this point. Note that while this example centers around data sent from an iSCSI initiator to an iSCSI target, the same logic applies in the other direction (iSCSI target to iSCSI initiator). Furthermore the same reasoning also applies to other applications that share a similar format (session-layer header followed by session layer payload), including both SMB/CIFS and NFS. Moreover, while TCP is discussed as the transport layer protocol, other similar connection-based, byte-stream protocols could instead be employed.

Figure 1:
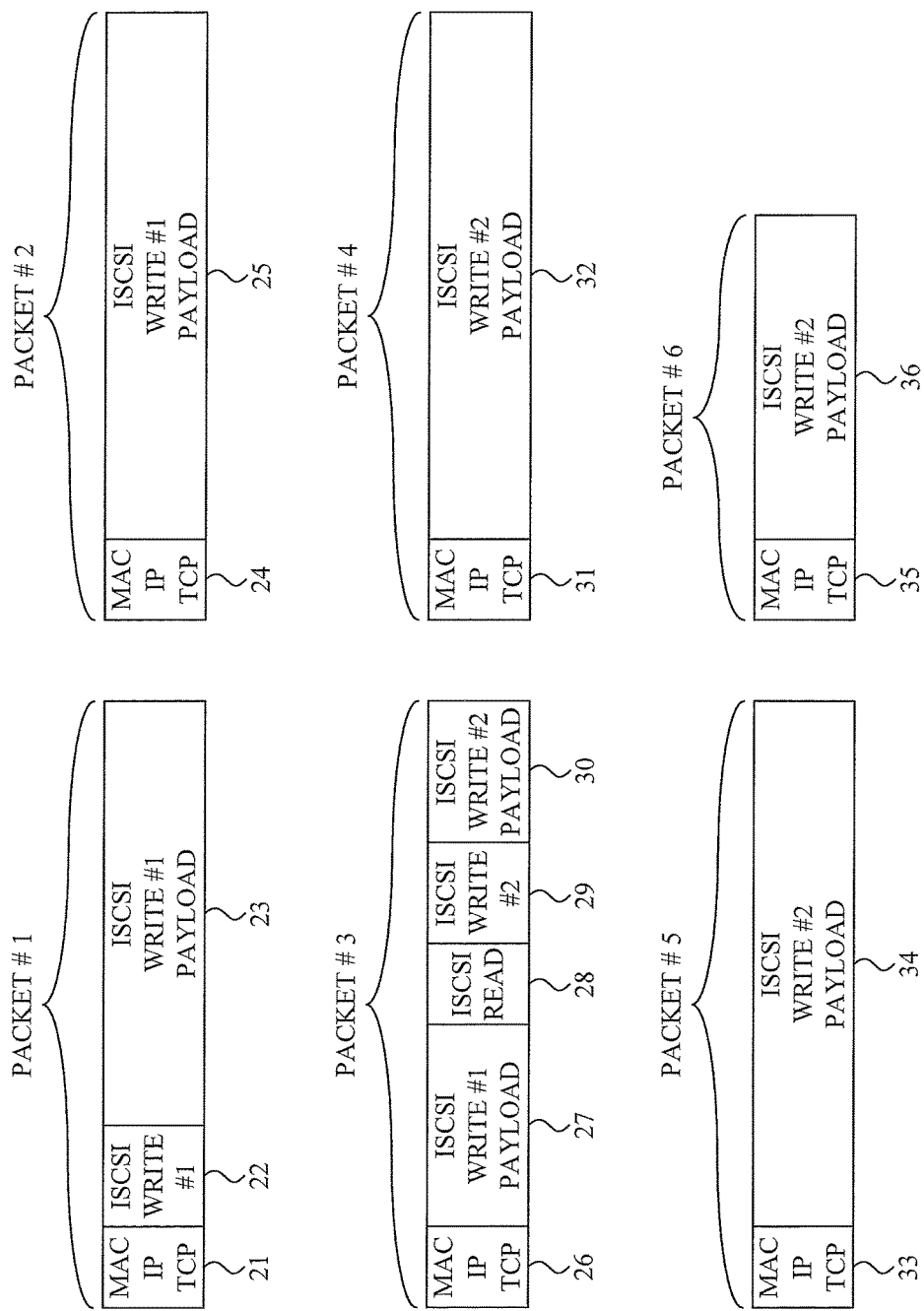
FIG. 1 shows three iSCSI Protocol Data Units for a particular TCP connection that have been received by an iSCSI target.

In the example shown in FIG. 1, three iSCSI Protocol Data Units (PDUs) for a particular TCP connection have been received by an iSCSI target. These PDUs include an iSCSI write request with 4KB of application data, an iSCSI read request, and a subsequent 4KB iSCSI write request. Assuming a standard Ethernet maximum transmission unit (MTU) size of approximately 1.5KB and no IP or TCP options, the corresponding packets on the wire would appear as shown in FIG. 1.

Packet #1 includes MAC, IP and TCP headers 21 totaling 54B, the iSCSI write request #1 session layer header 22 of 48B, and the first 1412B of the iSCSI write request #1 payload 23. Packet #2 includes MAC, IP and TCP headers 24 totaling 54B, and the next 1460B of the iSCSI write request #1 payload 25. Packet #3 includes MAC, IP and TCP headers 26 totaling 54B, the last 1224B of the iSCSI write request #1 payload 27, the iSCSI read request session layer header 28 of 48B, the iSCSI write request #2 session layer header 29 of 48B, and the first 140B of the iSCSI write request #2 payload 30. Packet #4 includes MAC, IP and TCP headers 31 totaling 54B, and the next 1460B of the iSCSI write request #2 payload 32. Packet #5 includes MAC, IP and TCP headers 33 totaling 54B, and the next 1460B of the iSCSI write request #2 payload 34. Finally, packet #6 includes MAC, IP and TCP headers 35 totaling 54B, and the remaining 1036B of the iSCSI write request #2 payload 36.

Thus, one can see that the first 4KB write spans the first three packets (1412 bytes of the first, 1460 of the second, and 1224 of the third, totaling 4096 bytes). This places the subsequent iSCSI headers at offsets 1278 and 1326 into the third packet respectively. Then, the second iSCSI request spans packets 3, 4, 5, and 6, again totaling 4096 bytes.

Conventionally, the above packets would typically have been processed as follows:

1) One or more packets will be received by the NIC and DMAd into packet buffers allocated by the NIC device driver. Assuming a fast network, and some amount of interrupt latency (interrupt aggregation enabled), this could include all six of the above packets. The remainder of this example assumes this to be the case.
2) Interrupt occurs.
3) The NIC device driver delivers all six packets to the protocol stack (Microsoft's TCPIP.SYS for example).
4) The protocol stack processes the MAC, IP, and TCP protocol headers (21, 24, 26, 31, 33 and 35), and "indicates" the TCP payload, starting with the first iSCSI write request, up to the iSCSI target software.
5) iSCSI target software processes the iSCSI Write Request #1 header 22, locates the memory location for iSCSI payload (23, 25 and 27), and passes this memory location down to the protocol stack.
6) The protocol stack copies, using the host processor, the payload (23, 25 and 27) for iSCSI write request #1 from packets 1, 2 and 3, into the memory location specified by the iSCSI target software.
7) The protocol stack completes this posted buffer and indicates the remainder of packet #3 to the iSCSI target software.
8) The iSCSI target software processes the iSCSI read request 28 and the second iSCSI write request 29, locates the memory location for the iSCSI write #2 payload (30, 32, 34 and 36) and passes this memory location down to the stack.
9) The protocol stack copies the application data (30, 32, 34 and 36) from packets 3, 4, 5 and 6 into this memory location and completes the posted buffer.

With the use of TCP offload, for example a TCP offload engine (TOE) device such as that invented by Alacritech in conjunction with a Microsoft® TCP Chimney protocol stack, there is an opportunity to eliminate the data copies in steps 6 and 9 in the above sequence of operations. As one example, the following may occur:

1) TOE device processes the MAC, IP and TCP headers (21, 24, 26, 31, 33 and 35) of each packet.
2) TOE device interrupts the host and delivers the TCP payload of Packet #1, including iSCSI Write Request #1 and iSCSI Write #1 payload of Packet #1 (22 and 23), to the device driver.
3) Device driver and protocol stack deliver TCP payload of Packet #1 (22 and 23) to iSCSI target software.
4) iSCSI target software processes Write Request 22, locates the memory location for iSCSI payload 23, and passes this memory location down to the protocol stack and TOE device driver.
5) TOE device driver passes this memory location to the TOE device.
6) TOE device DMAs the payload (23, 25 and 27) for iSCSI write #1 directly into the memory location specified by the iSCSI target software.
7) TOE device interrupts the host, completes the posted buffer for iSCSI write #1 and delivers the remainder of packet #3 which contains the iSCSI headers for the iSCSI read 28 and the second iSCSI write 29.
8) The TCP data from packet #3 (28, 29 and 30) is delivered to the iSCSI target software.
9) iSCSI target software processes iSCSI headers (28 and 29), locates memory location for iSCSI payload and passes this memory location down to the stack and TOE device driver.
10) TOE device driver passes this memory location to the TOE device.
11) TOE device DMAs the payload (30, 32, 34 and 36) for iSCSI write #2 directly into the memory location specified by the iSCSI target software.
12) TOE device interrupts the host, and completes the posted buffer for iSCSI write #2.

An issue with this approach is that eliminating these data copies comes at the expense of extra interrupts, as well as associated trips through the stack and device driver. In the prior conventional sequence of events there is a single interrupt and a single indication from the network device driver up to the TCPIP stack. In the sequence of events described immediately above, there are three interrupts—the original indication, the first buffer completion and second data indication, and lastly the second buffer completion. Furthermore, while the posted buffer in the first sequence of operations is only handed down as far as the stack, in the second sequence of operations it gets passed down to the device driver and out to the card as well, each portion of which requires some amount of overhead.

These two scenarios illustrate a trade-off between "batching"—processing several things at once as illustrated in the first case—and "zero copy". When payload sizes are relatively small, as is the case in this example, the overhead of extra interrupts and trips through the protocol stack outweigh the zero-copy benefits. As payload sizes get larger (64KB for example) the zero-copy benefits outweigh the batching benefits.

What would be desirable is a means to process a batch of session layer headers while holding the session layer payload out on the TOE device until corresponding buffers can be posted. Note that one difficulty with this objective is that session layer headers need not be located near the front of received packets, contiguous with TCP headers, but may instead be buried within the session layer payload data like in packet #3, with the session layer data and headers all being simply data to the TCP layer.

Figure 2:
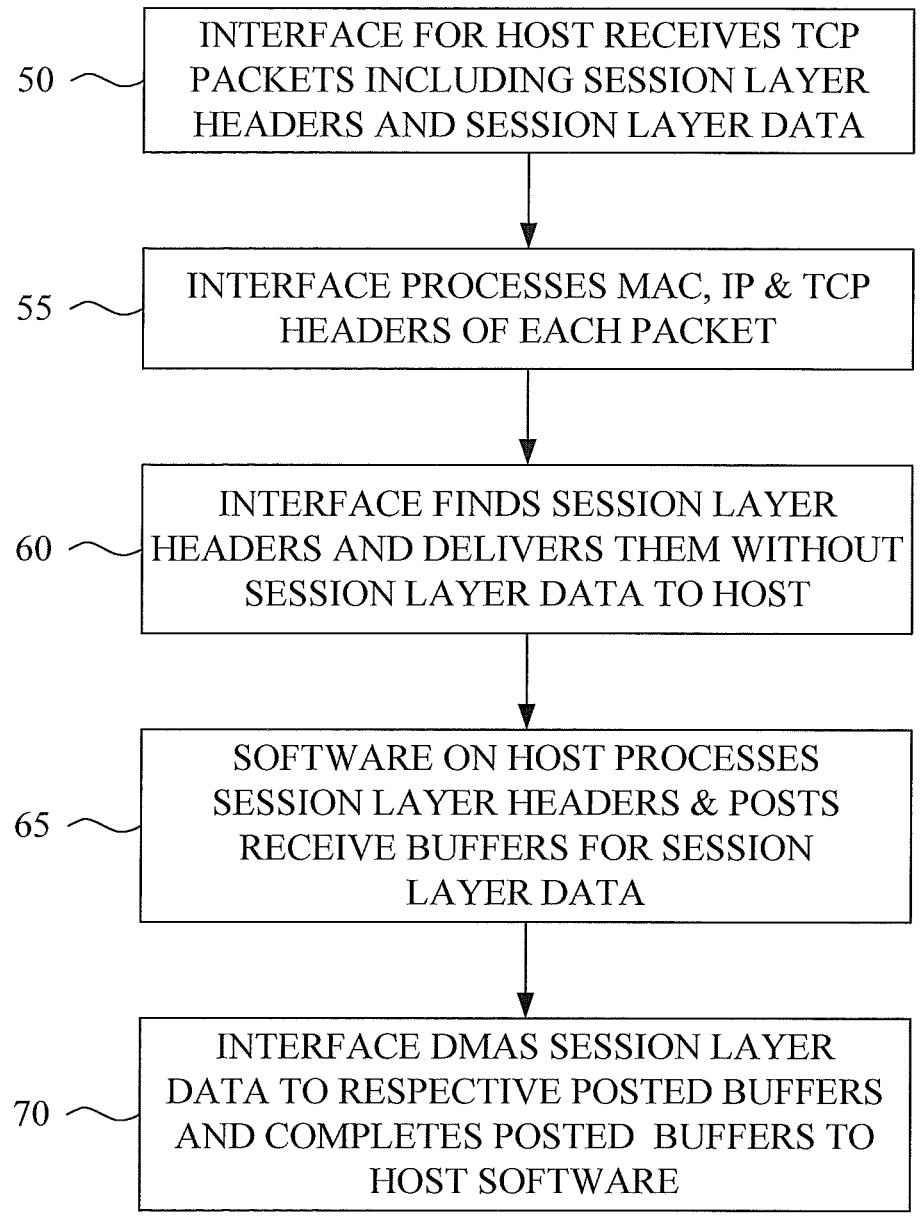
FIG. 2 shows a flow diagram of a method of receiving data packets.

In one embodiment in accordance with this objective, assuming the same packets were received as in the above examples, the following sequence of events occurs as shown in FIG. 2:

Step 1 (50): A network interface including a TOE device receives a plurality of TCP packets that include session layer headers and session layer data.

Step 2 (55): As the packets arrive, the interface processes MAC, IP and TCP headers (21, 24, 26, 31, 33 and 35).

Step 3 (60): The interface locates the iSCSI headers (22, 28 and 29) within TCP data stream and delivers them, independently of the data, to the host. Note that this step can occur along with Step 2, so that for example the interface can locate iSCSI header 22 prior to or at the same time as processing MAC, IP and TCP headers 24.

Step 4 (65): iSCSI target software on the host processes the three iSCSI headers (22, 28 and 29) and posts receive buffers for the application data from iSCSI write #1 and iSCSI write #2.

Step 5 (70): The interface DMAs the iSCSI payload (23, 25 and 27) into the posted buffer for write #1 and DMAs the iSCSI payload (30, 32, 34 and 36) into the posted buffer for write #2, and completes the posted buffers back to the iSCSI target.

Note that this is substantially different than conventional receive processing in several ways.

First, a unique aspect of the above sequence of operations is that data is delivered to the session layer (iSCSI target software in this example) is discontiguous—48 bytes from the first packet, and 96 from the third packet, with a gap in between. As such, this may involve significantly modifying the session-layer software to make it aware that it will be handed discontiguous blocks of data and that corresponding data buffers will be expected for the missing pieces.

Furthermore, since this solution may involve modifications to the session-layer software, we may as well go one step further and have the session-layer software (iSCSI target software in this example but also applicable to SMB/CIFS and NFS) communicate directly with the TOE device, rather than have data indications travel up through the NIC device driver and TCP/IP stack, or have posted receive buffers travel down the other direction.

Lastly, for the above sequence of operations the network interface has been enhanced to do a certain amount of session-layer header processing in order to locate the position of each session-layer header within the TCP data stream. Note that this would be virtually impossible to accomplish without TCP offload since there would be no way to verify the continuity of integrity of the data stream without first processing the corresponding TCP headers. TCP retransmissions or dropped packets would wreak havoc on any attempts to do this without TOE. In one embodiment, the network interface may analyze each received session layer header to determine the length of any corresponding application data that follows the header, in order to calculate the offset of the next session layer header.

In one exemplary embodiment, a session layer descriptor ring can be used to implement the transfer of a plurality of session layer headers from the network interface to the host for processing by the application. Note that a descriptor ring is merely used as an example, and that any host memory structure that is accessible by the NIC and maintains the session layer headers in order, such as a first-in first-out (FIFO) memory or a queue could instead be used. In one implementation, a first descriptor ring may be used for the session layer headers, and a second descriptor ring or other ordered memory structure may be used for the locations for storing session layer data, or for pointers to those locations. In one implementation, pointers to session layer headers can be used, wherein the pointers are stored in a memory structure that maintains the pointers in order. Note that session layer headers are sometimes called application layer headers.

In our iSCSI target example, the "session layer header" ring may consist of a collection of "descriptors" where each descriptor includes 48-bytes for an iSCSI header, and possibly additional status information to be shared between the iSCSI target software and the network interface. Entries on this ring can be filled in by the network interface as it encounters session layer headers. As it fills in entries on this ring, it would advance its location in the ring and notify the host (iSCSI target software) that its ring location has changed. The iSCSI target software would then walk down the ring, processing these descriptors and the iSCSI session-layer headers contained within them.

Figure 3:
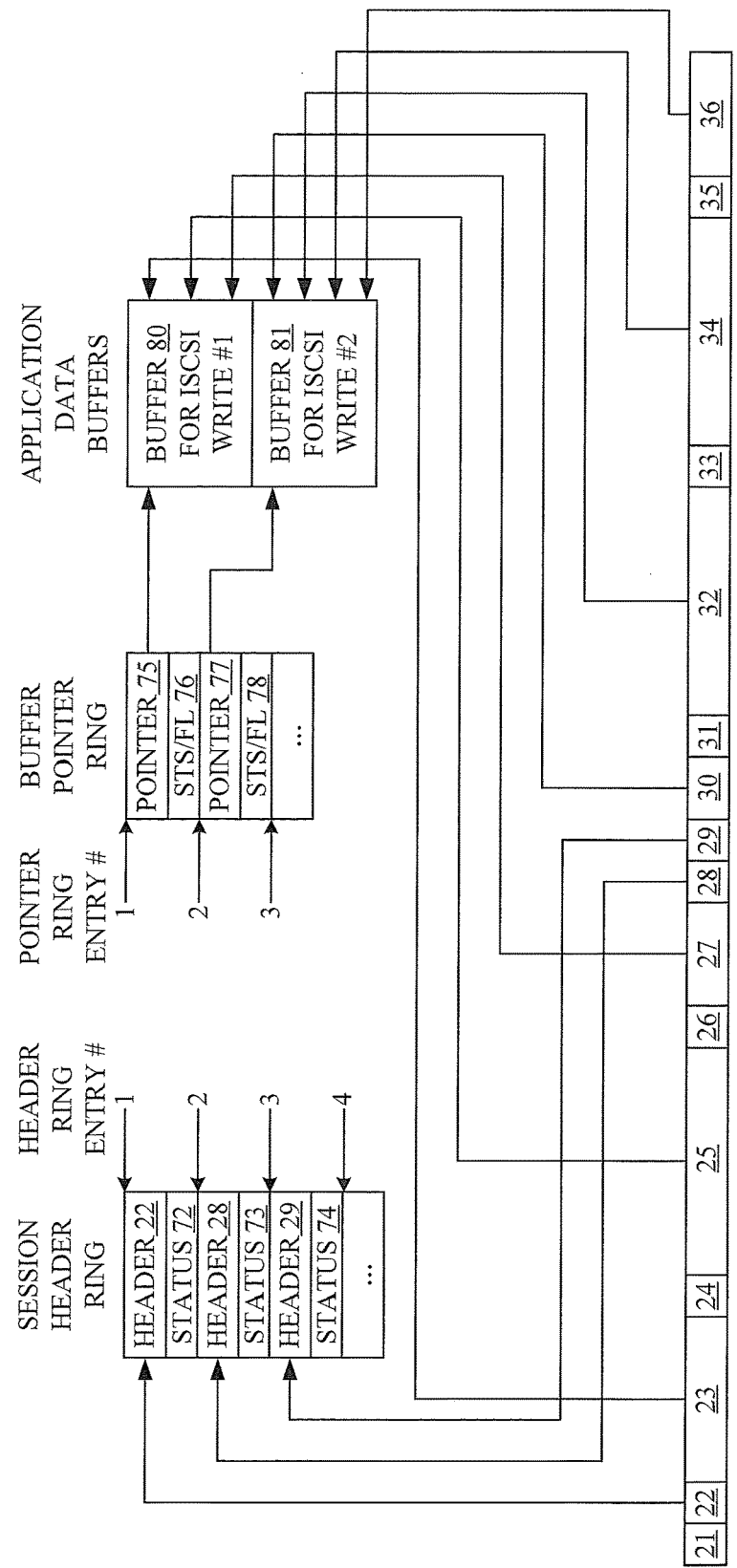
FIG. 3 shows a diagram of a method of receiving a stream of data.

The second ring may serve as a "buffer pointer" ring. Each entry within this ring would contain a pointer to a block of memory (or a scatter gather list representing such memory), and possibly associated status and/or flags. These entries would be filled in by the iSCSI target software as it processes iSCSI headers which describe subsequent iSCSI payload. Referring now to FIG. 3, which shows at the bottom the stream of received packet data corresponding to a particular TCP connection from FIG. 1, the following could take place:

1) TOE device processes MAC, IP and TCP headers 21 of packet #1.
2) Network interface processes TCP data of packet #1, including filling in the first entry in the session layer header ring by DMAing the session layer header 22 for iSCSI write #1 into it and filling in associated status 72, while holding on to the payload 23.
3) Network interface advances its current session header ring location to entry #2.
4) TOE device processes MAC, IP and TCP headers 24 of packet #2 and network interface holds on to the payload 25.
5) TOE device processes MAC, IP and TCP headers 26 of packet #2 and network interface fills in entries two and three of the session header ring with iSCSI headers 28 & 29, optionally including status 73 & 74, while hanging on to the end of the iSCSI write #1 payload 27 and the start of iSCSI write #2 payload 30.
6) Network interface advances its current session header ring location to entry #4.
7) Interrupt occurs—This could have occurred after step 4, but in this example is delayed due to interrupt aggregation.
8) The iSCSI target software compares its current session header ring location (1) to the network interface's current session header ring location (4) and determines that there are 3 headers to be processed.
9) The iSCSI target software processes entry #1 in the session header ring, and locates the memory location associated with iSCSI write #1.
10) The iSCSI target software fills in the first entry in the buffer pointer ring with a pointer 75 to this memory location (or a scatter gather list associated with it) as well as corresponding status and/or flags 76. In an alternative embodiment, instead of using a pointer ring the iSCSI target software may at this time simply provide a buffer for iSCSI write #1.

11) The iSCSI target software advances its buffer pointer ring location to entry 2.

12) The iSCSI target software processes entry #2 in the session header ring and arranges for a read response to be sent.

13) The iSCSI target software processes entry #3 in the session header ring and locates the memory locations associated with iSCSI write #2.

14) The iSCSI target software fills in the second entry in the buffer pointer ring with a pointer 77 to this memory location (or a scatter gather list associated with it) as well as corresponding status and/or flags 78.

15) The iSCSI target software advances its buffer pointer ring location to entry 3.

16) The iSCSI target software notifies the network interface (via a register write for example) of its new location in the buffer pointer ring.

17) The network interface compares its buffer pointer ring location against the host's newly written ring location and determines that there are two new entries to be processed.

18) The network interface processes the first entry in the buffer pointer ring to obtain the memory location for iSCSI write #1.

19) The network interface DMAs payload data (23, 25 and 27) from packets 1, 2 and 3 into the memory location specified by the buffer pointer ring entry #1, buffer 80.

20) The network interface processes the second entry in the buffer pointer ring to obtain the memory location for iSCSI write #2.

21) The network interface DMAs payload data (30, 32, 34 and 36) from packets 3, 4, 5 and 6 into the memory location specified by the buffer pointer ring entry #2, buffer 81.

22) The network interface advances its buffer pointer ring location to entry 3 and notifies the host (iSCSI target software).

23) The iSCSI target software compares the network interface's previous location (1) to the network interface's new location (3) and determines that entries 1 and 2 of the buffer pointer ring are now completed.

Thus, multiple session layer PDUs have been processed in a batch while the host CPU has been freed of copying data or even headers.

Figure 4:
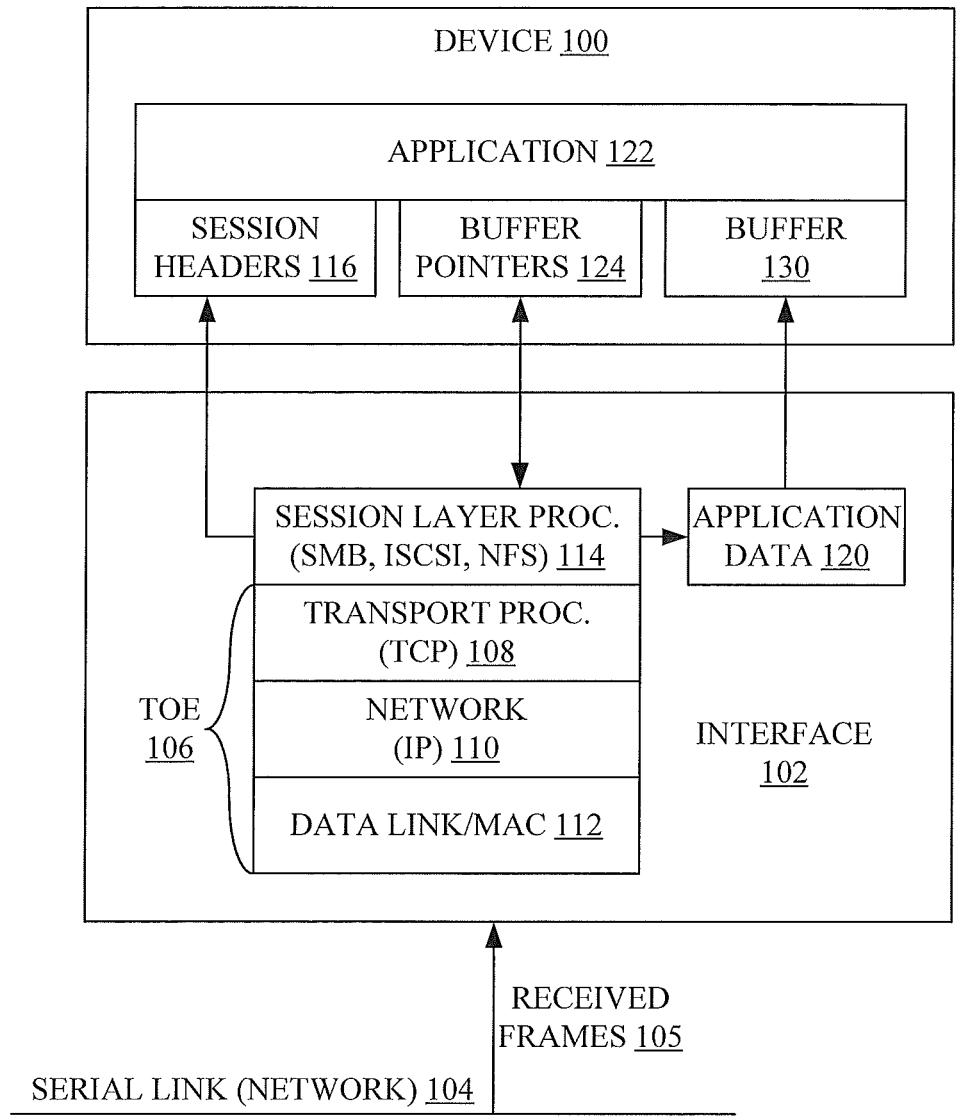
FIG. 4 shows a schematic block diagram of a system that performs the above methods shown in FIG. 2 and FIG. 3.

A schematic block diagram of a system that performs the above methods is shown in FIG. 4. A device 100 such as a computer has an interface such as network interface 102 that is connected to a serial link 104 such as a network, for example to receive Ethernet frames 105. The interface 102 has a TOE 106 including transport mechanism or processor 108 that processes at least data transfers for established TCP connections. Optionally, the TOE 106 may fully offload TCP, including establishing and terminating TCP connections as well as performing data transfer and all other details of the TCP protocol. The TOE 106 may also include mechanisms 110 and 112 to process network layer protocols (e.g., IP) and data link or media access control (MAC) protocols, respectively.

The interface 102 also includes a mechanism 114, such as instructions running on a processor, to analyze received session layer headers (e.g., SMB, iSCSI and NFS) to be able to locate such session layer headers even when they are surrounded by application data, so that the session layer headers can be removed from the application data and provided by the interface to a memory structure 116 such as a descriptor ring. The application data is split from the session layer headers and held on the interface in a memory 120 that preserves its order. An application 122 that corresponds to the TCP connection running on the interface can access the memory structure 116 holding the session layer headers, and in processing the headers determines a location such as buffer 130 for the corresponding application data. The address of that location may be held in memory structure 124 as a pointer to the buffer 130 for the data. The session layer mechanism 114 accesses the pointers in memory structure 124 to direct a DMA unit of interface 102 to move the application data to buffer 130. In an alternative embodiment the application data that has been received can be held on a buffer of the device 100, and moved to a buffer such as buffer 130 denoted by the application by a DMA unit of the device, rather than by a DMA unit of the interface 102.

As will be recognized by those skilled in the art, the innovative concepts described in the present application can be modified and varied over a tremendous range of applications, and accordingly the scope of patented subject matter is not limited by any of the specific exemplary teachings given. While the invention has been particularly shown and described with reference to a preferred embodiment, it will be understood by those skilled in the art that various changes in form and detail may be made therein without departing from the spirit and scope of the invention. None of the description in the present application should be read as implying that any particular element, step, or function is an essential element which must be included in the claim scope. THE SCOPE OF PATENTED SUBJECT MATTER IS DEFINED ONLY BY THE ALLOWED CLAIMS. Moreover, none of these claims are intended to invoke paragraph six of 35 USC Section 112 unless the exact words "means for" are followed by a participle.

The invention claimed is:

1. A method comprising:
   receiving a plurality of packets, each of the packets having a Transmission Control Protocol (TCP) header and TCP data;
   processing the packets by TCP, including removing the TCP headers from the TCP data, associating the TCP data with a TCP connection for an application, and updating a TCP control block (TCB) that defines the TCP connection;
   locating a plurality of upper layer headers in the TCP data, the plurality of upper layer headers corresponding to application data contained in the packets such that each of the upper layer headers is associated with a different portion of the application data, wherein the plurality of upper layer headers correspond to a protocol that is higher than TCP;
   processing the plurality of upper layer headers by the application to obtain memory locations for the application data; and then
   placing the application data in the locations.

2. The method of claim 1, wherein processing the plurality of upper layer headers by the application is performed by a device, and processing the packets by TCP is performed by an interface for the device.

3. The method of claim 2, further comprising:
sending, by the interface to the device, the plurality of upper layer headers without the application data, prior to processing the plurality of upper layer headers by the application.

4. The method of claim 1, further comprising:
storing the plurality of upper layer headers, without the application data, in a memory structure, wherein the memory structure holds the plurality of upper layer headers in order.

5. The method of claim 1, further comprising:
storing the plurality of upper layer headers, without the application data, in a descriptor ring.

6. The method of claim 1, further comprising:
storing a pointer to each of the plurality of upper layer headers in a memory structure, wherein the memory structure holds the pointers in order.

7. The method of claim 1, further comprising:
storing pointers to the locations for the application data in a memory structure that holds the pointers in order.

8. The method of claim 1, further comprising:
storing pointers to the locations for the application data in a descriptor ring.

9. The method of claim 1, further comprising:
analyzing the plurality of upper layer headers to separate the plurality of upper layer headers from the application data, prior to processing the plurality of upper layer headers by the application.

10. The method of claim 9, wherein the application is running on a device and the analyzing is performed by an interface for the device.

11. The method of claim 1, wherein the upper layer header is a session layer header.

12. The method of claim 1, wherein the upper layer header is an Internet Small Computer System Interface (iSCSI) header.

13. The method of claim 1, wherein the upper layer header is a Server Message Block (SMB) header.

14. The method of claim 1, wherein the upper layer header is a Network File System (NFS) header.

15. The method of claim 1, wherein receiving the plurality of packets is not in response to a request by the application for the application data.

16. A method comprising:
receiving a plurality of packets, each of the packets having a Transmission Control Protocol (TCP) header and TCP data, wherein each byte of the TCP data has an associated sequence number;
processing the packets by TCP, including removing the TCP headers from the TCP data and associating the TCP data with a TCP connection;
delivering the TCP data, without the TCP headers, to an application out-of-order, including delivering an upper layer header to the application prior to delivering application data having a sequence number earlier than that of the upper layer header, wherein the upper layer header corresponds to a protocol higher than TCP.

17. The method of claim 16, wherein delivering the TCP data to an application out-of-order includes providing the application data and the upper layer header to a device from an interface for the device.

18. The method of claim 17, wherein the interface includes a TCP Offload Engine (TOE).

19. The method of claim 16, wherein delivering the TCP data to an application out-of-order includes providing the application data to a first set of buffers and providing the upper layer header to a second set of buffers, wherein the second set of buffers holds a plurality of upper layer headers in order.

20. The method of claim 16, wherein delivering the TCP data to an application out-of-order includes placing the upper layer header in a descriptor ring.

21. The method of claim 16, further comprising:
processing the upper layer header by the application to obtain a location for the application data, and placing the location for the application data in a descriptor ring.

22. The method of claim 16, further comprising:
analyzing the upper layer header prior to delivering the upper layer header to the application.

23. The method of claim 22, wherein the application is running on a device and the analyzing is performed by an interface for the device.

24. The method of claim 16, wherein the upper layer header is a session layer header.

25. The method of claim 16, wherein the upper layer header is an Internet Small Computer System Interface (iSCSI) header.

26. The method of claim 16, wherein the upper layer header is a Server Message Block (SMB) header.

27. The method of claim 16, wherein the upper layer header is a Network File System (NFS) header.

28. The method of claim 16, wherein receiving the plurality of packets is not in response to a request by the application for the application data.

* * * * *